(12) United States Patent
Okumura et al.

(10) Patent No.: US 10,696,293 B2
(45) Date of Patent: Jun. 30, 2020

(54) START CONTROLLER AND START CONTROLLING METHOD

(71) Applicant: TOYOTA JIDOSHA KABUSHIKI KAISHA, Toyota-shi, Aichi-ken (JP)

(72) Inventors: Shin Okumura, Okazaki (JP); Hiroshi Sato, Nagoya (JP); Koji Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/359,955

(22) Filed: Mar. 20, 2019

(65) Prior Publication Data

US 2019/0315339 A1 Oct. 17, 2019

(30) Foreign Application Priority Data

Apr. 11, 2018 (JP) .................................. 2018-076237

(51) Int. Cl.
*F02N 11/04* (2006.01)
*B60W 20/40* (2016.01)
(Continued)

(52) U.S. Cl.
CPC ......... *B60W 20/40* (2013.01); *F02D 41/0002* (2013.01); *F02D 41/062* (2013.01); *F02D 41/3094* (2013.01); *F02N 11/0818* (2013.01); *F02N 11/0848* (2013.01); *F02D 2041/002* (2013.01); *F02N 2011/0896* (2013.01)

(58) Field of Classification Search
CPC ...... B60W 20/40; B60W 20/10; B60W 10/06; B60W 10/08; B60W 2710/06; F02D 41/0002; F02D 41/062; F02D 41/3094; F02D 41/042; F02D 41/065; F02D 41/06; F02D 2041/002; F02D 2200/503; F02D 2200/0404; F02D 9/02; F02N 11/0818; F02N 11/0848; F02N 11/0866; F02N 11/0825; F02N 11/00; F02N 11/04; F02N 2011/0896; F02N 2011/0888; F02N 2200/021; F02N 2300/104; F02N 2300/2002; F02N 19/005; B60K 6/20; B60K 6/24; B60K 6/26
USPC ............. 123/179.3, 179.4, 435, 491, 179.28; 701/112, 113
See application file for complete search history.

(56) References Cited

U.S. PATENT DOCUMENTS

| | | |
|---|---|---|
| 2006/0048734 A1 | 3/2006 | Kataoka et al. |
| 2014/0172219 A1 | 6/2014 | Nakanishi et al. |
| 2017/0089314 A1 | 3/2017 | Books et al. |

FOREIGN PATENT DOCUMENTS

| | | | |
|---|---|---|---|
| JP | 2008-133793 A | 6/2008 | |
| JP | 2013-252725 A | 12/2013 | |
| WO | 2004/067949 A1 | 8/2004 | |

*Primary Examiner* — Hai H Huynh
(74) *Attorney, Agent, or Firm* — Oliff PLC

(57) ABSTRACT

A drive control section automatically stops an engine by stopping fuel injection and by closing a throttle valve that adjusts the amount of intake air when a predetermined specified condition is satisfied. A stopping-angle detection section detects a crank angle when the engine is automatically stopped as a stopping angle. The drive control section cranks the engine before an in-cylinder negative pressure period, in which pressure in a cylinder of the engine is negative pressure, elapses after starting to automatically stop the engine if the stopping angle is outside an allowable crank-angle range in which it is possible to restart the engine by cranking the engine by the motor generator.

8 Claims, 4 Drawing Sheets

(51) Int. Cl.
*F02D 41/00* (2006.01)
*F02D 41/06* (2006.01)
*F02D 41/30* (2006.01)
*F02N 11/08* (2006.01)

START CONTROLLER AND START CONTROLLING METHOD

BACKGROUND

1. Field

The present disclosure relates to a start controller and a start controlling method that are employed in a hybrid system of a vehicle.

2. Description of Related Art

A start controller of a hybrid system disclosed by Japanese Laid-Open Patent Publication No. 2013-252725 detects a crank angle when an engine is stopped. Additionally, in the start controller, a predetermined angular range is set to the range of a crank angle in which a starting torque required to restart the engine becomes a predetermined value or less. If the crank angle in a state in which the engine is in a stopped state is outside the predetermined angular range when the engine is restarted, the start controller, first of all, reversely rotates the crankshaft by means of a motor generator, and sets the crank angle so as to fall within the predetermined angular range. Thereafter, the start controller normally rotates the crankshaft by means of the motor generator, and then starts fuel injection to restart the engine.

In the start controller of this document, if the crank angle in a state in which the engine is in a stopped state is outside the predetermined angular range, a period of time required to restart the engine becomes longer in proportion to the time of an operation for reversely rotating the crankshaft. Therefore, there is a fear that the responsivity of engine restarting will deteriorate, and an uncomfortable feeling will be given to the vehicle driver.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a start controller is provided that is employed in a hybrid system including an engine serving as a driving source of a vehicle and a motor generator drivably connected to the engine. The start controller includes a drive control section and a stopping-angle detection section. The drive control section automatically stops the engine and limits an intake air amount into the engine by stopping fuel injection in the engine when a predetermined specified condition is satisfied. The stopping-angle detection section detects a crank angle of a crankshaft when the engine is automatically stopped as a stopping angle. The drive control section is configured such that, if the stopping angle is outside a stopping-angle range of the crank angle in which it is possible to restart the engine by cranking the engine by means of the motor generator, the drive control section cranks the engine by means of the motor generator or to restart the engine by resuming fuel injection in the engine before an in-cylinder negative pressure period, which is defined as a period of time in which pressure in a cylinder of the engine is negative pressure relative to an atmospheric pressure, elapses after starting to automatically stop the engine.

In a second general aspect, a start controller is provided that is employed in a hybrid system including an engine serving as a driving source of a vehicle and a motor generator drivably connected to the engine. The start controller includes a drive control section and an allowable-angle calculating section. The drive control section automatically stops the engine and limits an intake air amount into the engine by stopping fuel injection in the engine when a predetermined specified condition is satisfied. The allowable-angle calculating section calculates, as an allowable crank-angle range, a stopping-angle range of a crank angle in a crankshaft in which it is possible to restart the engine by cranking the engine by means of the motor generator. The drive control section is configured such that, if the allowable crank-angle range is smaller than or equal to a predetermined specified range, the drive control section cranks the engine by means of the motor generator or to restart the engine by resuming the fuel injection in the engine before an in-cylinder negative pressure period, which is defined as a period of time in which pressure in a cylinder of the engine is negative pressure relative to an atmospheric pressure, elapses after starting to automatically stop the engine.

In a third general aspect, a start controlling method is provided that is employed in a hybrid system including an engine serving as a driving source of a vehicle and a motor generator drivably connected to the engine. The start controlling method includes: automatically stopping the engine and limiting an intake air amount into the engine by stopping fuel injection in the engine when a predetermined specified condition is satisfied; detecting a crank angle of a crankshaft when the engine is automatically stopped as a stopping angle; and if the stopping angle is outside a stopping-angle range of the crank angle in which it is possible to restart the engine by cranking the engine by means of the motor generator, cranking the engine by means of the motor generator or restarting the engine by resuming the fuel injection in the engine before an in-cylinder negative pressure period, which is defined as a period of time in which pressure in a cylinder of the engine is negative pressure relative to an atmospheric pressure, elapses after starting to automatically stop the engine.

In a fourth general aspect, a start controlling method is provided that is employed in a hybrid system including an engine serving as a driving source of a vehicle and a motor generator drivably connected to the engine. The start controlling method includes: automatically stopping the engine and limiting an intake air amount into the engine by stopping fuel injection in the engine when a predetermined specified condition is satisfied; calculating, as an allowable crank-angle range, a stopping-angle range of a crank angle in a crankshaft in which it is possible to restart the engine by cranking the engine by means of the motor generator; and if the allowable crank-angle range is smaller than or equal to a predetermined specified range, cranking the engine by means of the motor generator or restarting the engine by resuming the fuel injection in the engine before an in-cylinder negative pressure period, which is defined as a period of time in which pressure in a cylinder of the engine is negative pressure relative to an atmospheric pressure, elapses after starting to automatically stop the engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Embodiments of the present disclosure will hereinafter be described. First, a schematic configuration of a hybrid system of a vehicle will be described with reference to FIG. 1.

Figure 1:
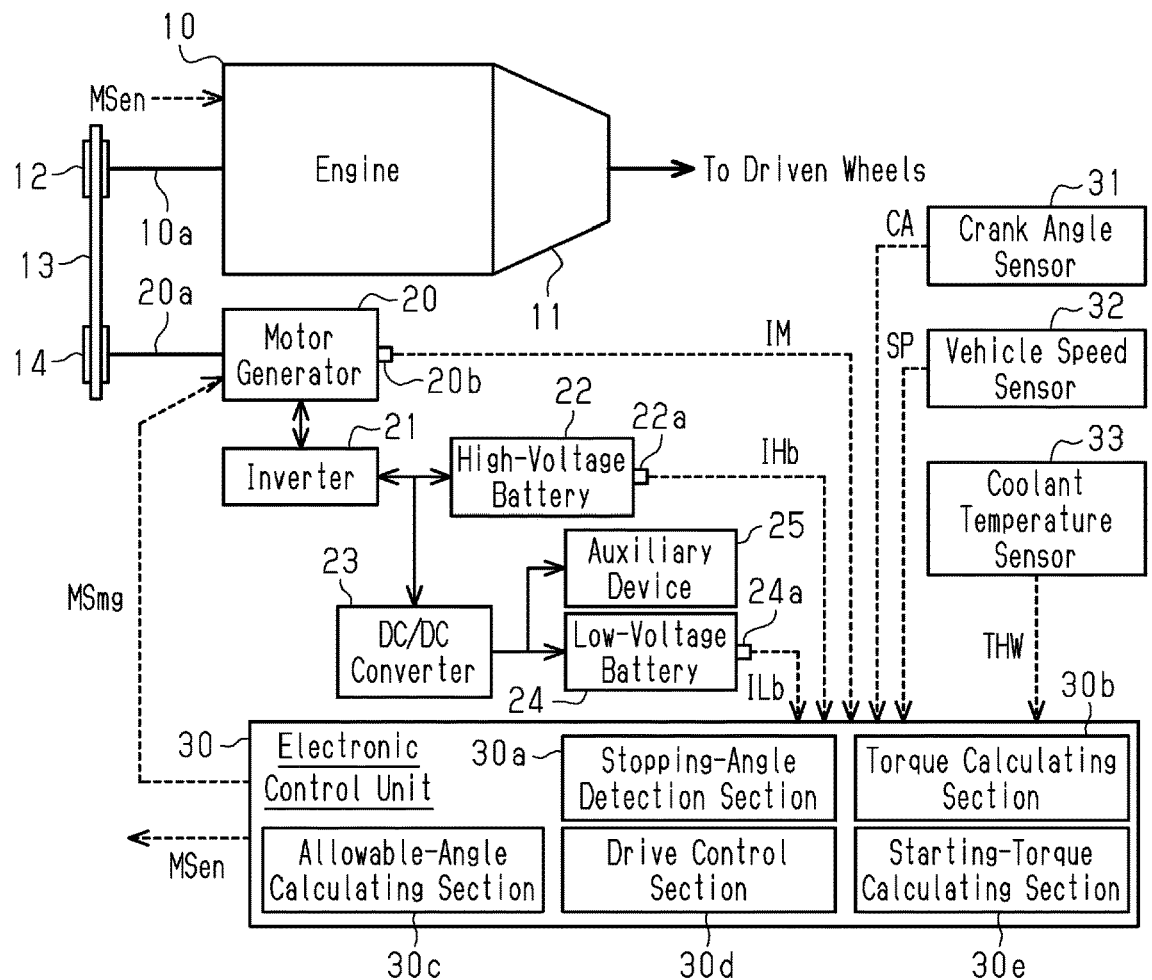
FIG. 1 is a schematic diagram showing the configuration of a hybrid system.

As shown in FIG. 1, the hybrid system includes a four-cylinder engine 10 that serves as a driving source. In the engine 10, fuel injection and fuel combustion are performed by turns in each cylinder. Additionally, a cycle from the start of an intake stroke in the cylinders of the engine 10 to the end of an exhaust stroke through a compression stroke and an expansion stroke (combustion stroke) is defined as one combustion cycle (720 CA). At this time, the combustion cycles of the four cylinders are shifted from each other by a quarter of a cycle (180 CA).

The engine 10 has a crankshaft 10*a* drivably connected to the driven wheels through a transmission 11 and the like. The crankshaft 10*a* is drivably connected to a first pulley 12. A transmission belt 13 is looped over the first pulley 12. The crankshaft 10*a* is also drivably connected to a hydraulic pump that generates oil pressure, an air-conditioning compressor, and the like, through a belt, a pulley, a gear (sprocket), a chain, and the like (not shown).

The hybrid system includes a motor generator 20 serving as a driving source that differs from the engine 10. The motor generator 20 is what-is-called a three-phase alternating current electric motor. The motor generator 20 has an output shaft 20*a* drivably connected to a second pulley 14. The transmission belt 13 is looped over the second pulley 14. Therefore, the motor generator 20 is drivably connected to the crankshaft 10*a* through the second pulley 14, the transmission belt 13, and the first pulley 12.

When the motor generator 20 functions as an electric motor, the motor generator 20 applies rotational torque to the second pulley 14, and its rotational torque is input to the crankshaft 10*a* through the transmission belt 13 and the first pulley 12. In this case, the motor generator 20 assists the driving of the engine 10. On the other hand, when the motor generator 20 functions as a power generator, the rotational torque of the crankshaft 10*a* is input to the output shaft 20*a* of the motor generator 20 through the first pulley 12, the transmission belt 13, and the second pulley 14. Thereafter, the motor generator 20 generates electricity in accordance with the rotation of the output shaft 20*a*.

A sensor section 20*b* that detects the state of the motor generator 20 is incorporated in the motor generator 20. The sensor section 20*b* detects an input voltage that is input into the motor generator 20, an input current, temperature, the rotation speed of the output shaft 20*a*, and the like, and then outputs these detection results as a signal indicating state information IM of the motor generator 20.

The motor generator 20 is connected to a high-voltage battery 22 through an inverter 21. The inverter 21 is a bidirectional inverter, and converts an AC voltage generated by the motor generator 20 into a DC voltage, and then outputs it to the high-voltage battery 22, and converts the DC voltage output by the high-voltage battery 22 into an AC voltage, and then outputs it to the motor generator 20. Although FIG. 1 depicts the inverter 21 as a component differing from the motor generator 20, the inverter 21 is built inside the housing of the motor generator 20 in some cases.

The high-voltage battery 22 is a lithium-ion battery. When the motor generator 20 functions as an electric motor, the high-voltage battery 22 supplies electric power to the motor generator 20. Additionally, when the motor generator 20 functions as a power generator, the high-voltage battery 22 is supplied and charged with electric power from the motor generator 20.

A sensor section 22*a* that detects the state of the high-voltage battery 22 is incorporated in the high-voltage battery 22. The sensor section 22*a* detects the terminal-to-terminal voltage, the output current, the temperature, and the like, of the high-voltage battery 22, and outputs these detection results as a signal indicating state information IHb of the high-voltage battery 22.

The motor generator 20 is connected to a DC/DC converter 23 through the inverter 21. The DC/DC converter 23 is connected also to the high-voltage battery 22. The DC/DC converter 23 lowers the DC voltage output from the inverter 21 or from the high-voltage battery 22 to 12 V to 15 V, and outputs it. The DC/DC converter 23 is connected to a low-voltage battery 24.

The low-voltage battery 24 is a 12-voltage lead-acid battery that is lower in voltage than the high-voltage battery 22. The low-voltage battery 24 outputs a DC voltage of 12 V when the DC/DC converter 23 is not operating or when the output voltage of the DC/DC converter 23 is 12 V. When the output voltage of the DC/DC converter 23 is higher than the open-circuit voltage (OCV) of the low-voltage battery 24, the low-voltage battery 24 is supplied and charged with electric power from the DC/DC converter 23.

A sensor section 24*a* that detects the state of the low-voltage battery 24 is incorporated in the low-voltage battery 24. The sensor section 24*a* detects the terminal-to-terminal voltage, the output current, the temperature, and the like, of the low-voltage battery 24, and outputs these detection results as a signal indicating state information ILb of the low-voltage battery 24.

The DC/DC converter 23 and the low-voltage battery 24 are connected to various auxiliary devices 25. The auxiliary devices 25 include lights of the vehicle such as the headlights, the turn signals, and the interior light, and interior devices such as a car navigation system and speakers. When the DC/DC converter 23 is not operating, the auxiliary devices 25 are supplied with electric power from the low-voltage battery 24. When the output voltage of the DC/DC converter 23 is higher than the open-circuit voltage (OCV) of the low-voltage battery 24, the auxiliary devices 25 are supplied with electric power from the DC/DC converter 23.

As shown in FIG. 1, the hybrid system includes an electronic control unit 30 serving as a start controller that controls the engine 10, the motor generator 20, and the like. The electronic control unit 30 is processing circuitry (computer) that includes an arithmetic section that executes various programs (applications), a nonvolatile memory section in which programs and the like are stored, a volatile memory in which pieces of data are temporarily stored when a program is executed, and the like.

The electronic control unit 30 receives signals that indicate the states of respective parts of the vehicle from various sensors or the like that are mounted on the vehicle. In detail, the electronic control unit 30 receives a signal indicating the crank angle CA of the crankshaft 10a from a crank angle sensor 31. The crank angle sensor 31 detects the crank angle CA of the crankshaft 10a per unit time. The electronic control unit 30 calculates the engine rotation speed Ne of the engine 10 on the basis of the crank angle CA detected by the crank angle sensor 31. Furthermore, when the engine 10 is automatically stopped, the electronic control unit 30 detects the crank angle CA detected by the crank angle sensor 31 when the crankshaft 10a is stopped, and detects this crank angle CA as a stopping angle CAs. In other words, the electronic control unit 30 functions as a stopping-angle detection section 30a.

The electronic control unit 30 receives a signal indicating a vehicle speed SP from a vehicle speed sensor 32. Additionally, the electronic control unit 30 receives a signal indicating the coolant temperature THW of the engine 10 from a coolant temperature sensor 33. The coolant temperature sensor 33 is attached to the outlet of the water jacket defined in the cylinder block or the cylinder head of the engine 10. The coolant temperature sensor 33 detects the temperature of coolant in the outlet of the water jacket as the coolant temperature THW.

The electronic control unit 30 receives state information IHb from the sensor section 22a of the high-voltage battery 22. The electronic control unit 30 calculates the state of charge (SOC) of the high-voltage battery 22 based on pieces of information of the terminal-to-terminal voltage, the output current, the temperature, and the like, of the high-voltage battery 22, which are included in the state information IHb. In the present embodiment, the state of charge of the high-voltage battery 22 refers to the ratio of electric energy with which the high-voltage battery 22 is charged when the state information IHb is input in relation to the fully-charged electric energy of the high-voltage battery 22, and is represented as, for example, percentage (%). Likewise, the electronic control unit 30 receives state information ILb from the sensor section 24a of the low-voltage battery 24. The electronic control unit 30 calculates the state of charge of the low-voltage battery 24 based on information included in the state information ILb.

The electronic control unit 30 receives the state information IM from the sensor section 20b of the motor generator 20. The electronic control unit 30 calculates an available torque Tmg of the motor generator 20 based on pieces of information, such as the input voltage, the input current, the temperature of the motor generator 20, and the rotation speed of the output shaft 20a, that are included in the state information IM and based on the state of charge of the high-voltage battery 22. In other words, the electronic control unit 30 functions as a torque calculating section 30b. Furthermore, based on the calculated available torque Tmg and the like, the electronic control unit 30 calculates a stopping-angle range of the crank angle CA, within which the engine 10 can be restarted by being cranked by the motor generator 20 as an allowable crank-angle range CAa. In other words, the electronic control unit 30 functions as an allowable-angle calculating section 30c.

Based on signals input from various sensors and the like, the electronic control unit 30 generates a manipulation signal MSen to control the engine 10, and outputs the manipulation signal MSen to the engine 10. In the engine 10, the fuel injection amount from fuel injection valve through which fuel is injected into the cylinder and the opening degree of the throttle valve by which the intake air amount into the engine 10 is adjusted are adjusted in accordance with the manipulation signal MSen. Additionally, when the engine 10 receives a manipulation signal MSen that instructs automatic stopping of the engine 10, the fuel injection in the engine 10 is stopped, and the throttle valve is closed, which in turn limits, the intake air amount into the engine 10.

Based on signals input from various sensors and the like, the electronic control unit 30 generates a manipulation signal MSmg to control the motor generator 20, and outputs the manipulation signal MSmg to the motor generator 20. In the motor generator 20, the amount of discharge when the motor generator 20 functions as a motor or the amount of power generation when the motor generator 20 functions as a power generator are controlled on the basis of the manipulation signal MSmg. Additionally, when the engine 10 is restarted after being automatically stopped, the electronic control unit 30 outputs a manipulation signal MSmg that instructs cranking of the engine 10 prior to the start of fuel injection. As thus described, the electronic control unit 30 functions as a drive control section 30d that controls the automatic stop and the restart of the engine 10.

The fuel injection amount required to allow idling of the engine 10 is stored in the memory section of the electronic control unit 30 on the assumption that the engine 10 is in a factory default state in which the engine 10 has no deterioration or the like and that the engine 10 is in the ideal state in which the engine 10 has been produced without errors according to specifications. In the present embodiment, the term "idling" denotes a state of operating the engine 10 at the minimum engine rotation speed Ne at which the engine 10 can be operated independently and continuously without being assisted by the motor generator 20. Additionally, the fuel injection amount in the ideal state and in an idling operation is pre-calculated by performing tests, simulations, and the like.

Figure 2:
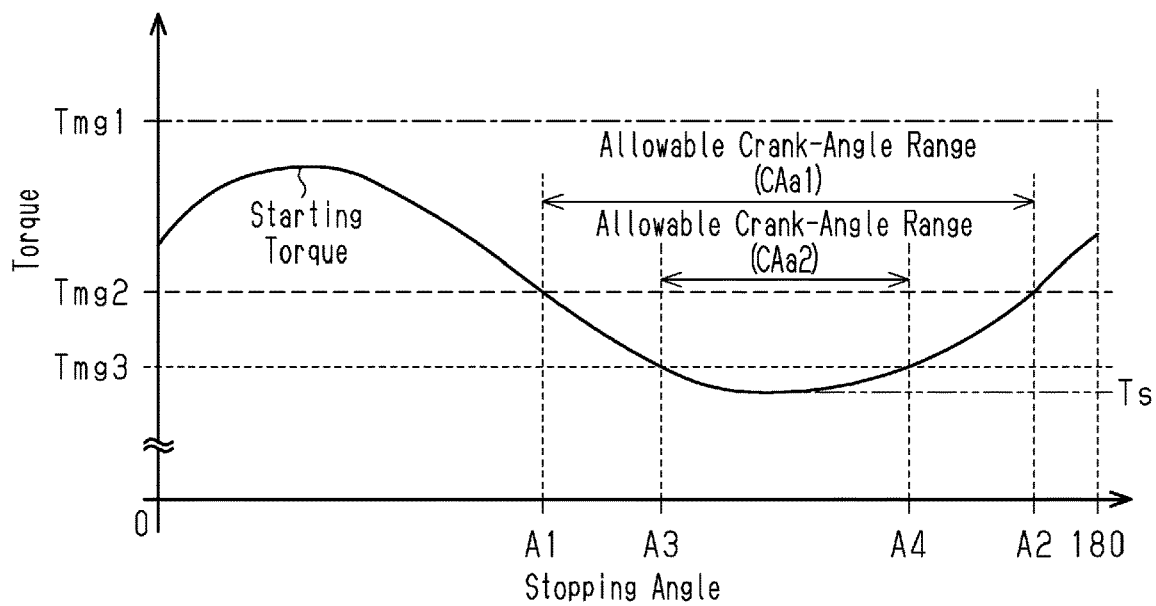
FIG. 2 is a graph showing a relationship between a stopping angle of a crankshaft and a starting torque required to restart an engine that has been stopped.
Figure 3:
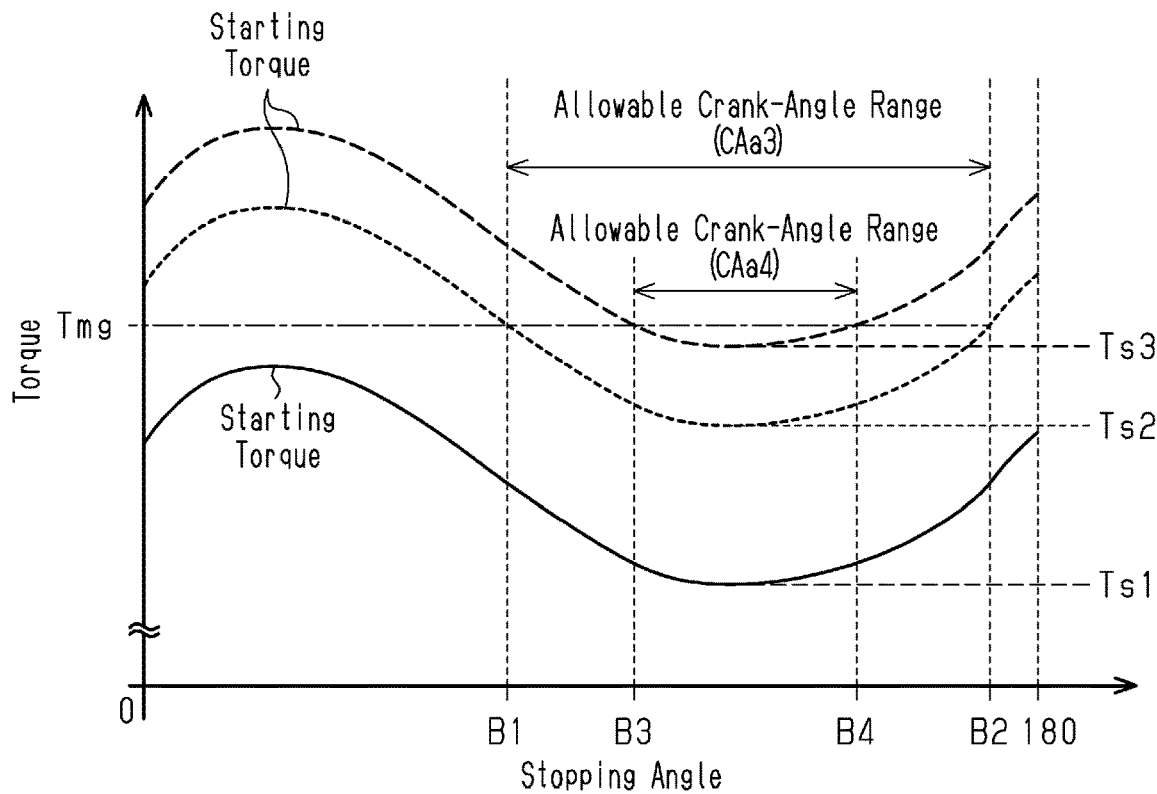
FIG. 3 is a graph showing a relationship between a stopping angle of the crankshaft and the starting torque required to restart the engine that has been stopped.

The relationship between a stopping angle of the crankshaft 10a of the engine 10 being in the ideal state and a starting torque required to restart the engine 10, which has been stopped, is stored in the memory section of the electronic control unit 30. As shown in FIGS. 2 and 3, the relationship between the stopping angle of the crankshaft 10a and the starting torque of the engine 10 repeatedly changes every 180 CA.

In detail, the starting torque of the engine 10 gradually becomes greater in proportion to increase from 0 CA of the stopping angle of the crankshaft 10a, and reaches its largest value at a predetermined stopping angle. The stopping angle of the crankshaft 10a at which the starting torque is maximized is, for example, near the crank angle CA at which the intake valve of a cylinder that is in a compression stroke when the engine 10 is stopped is closed. After the starting torque is maximized, the starting torque of the engine 10 gradually becomes smaller in proportion to increase in the stopping angle of the crankshaft 10a, and becomes the minimum starting torque Ts at a predetermined stopping angle. The stopping angle of the crankshaft 10a at which the starting torque becomes the minimum starting torque Ts is, for example, slightly before the crank angle CA at which the exhaust valve of a cylinder that is in an expansion stroke when the engine 10 is stopped is opened. Thereafter, the starting torque of the engine 10 gradually becomes greater in proportion to an approach to 180 CA of the stopping angle of the crankshaft 10a. The relationship between the stopping angle of the crankshaft 10a being in the ideal state and a starting torque is precalculated by performing tests, simulations, and the like. The electronic control unit 30 calculates the starting torque required to restart the engine on the basis of the fuel injection amount Qf of the engine 10 or on the basis of the relationship between the stopping angle of the crankshaft 10a and the starting torque of the engine 10. In other words, the electronic control unit 30 functions as a starting-torque calculating section 30e.

Figure 4:
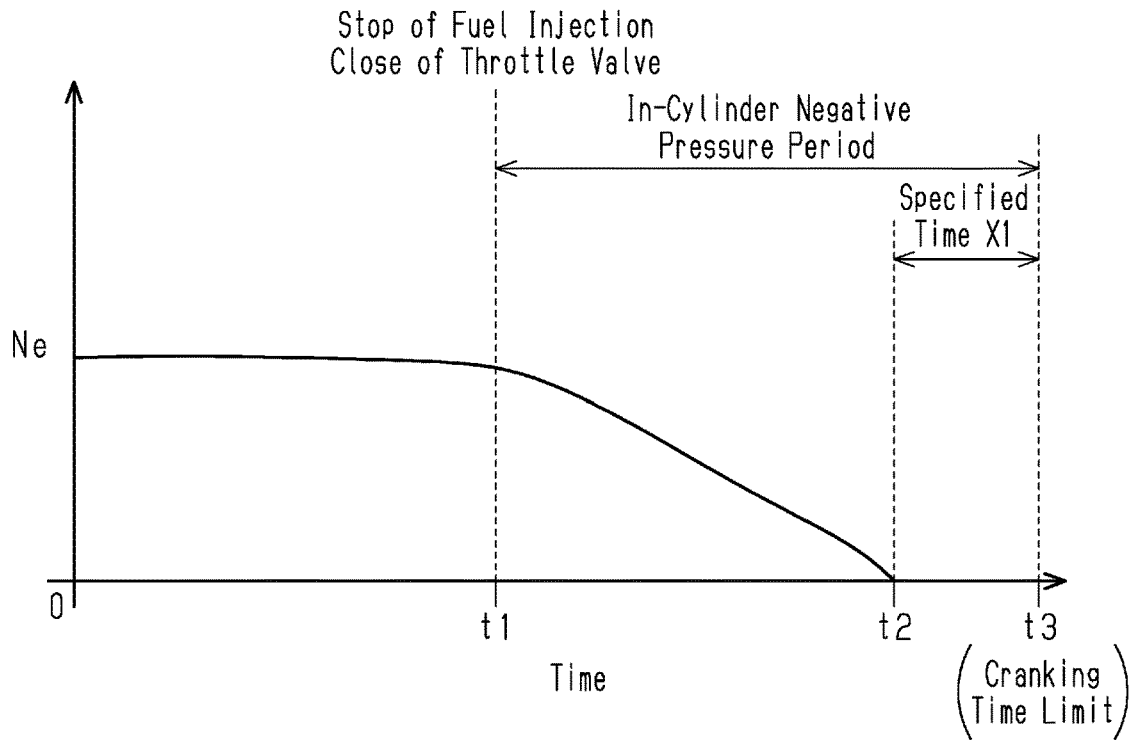
FIG. 4 is a graph showing a relationship between the engine rotation speed and an in-cylinder negative pressure period.

Specified time X1, which is to calculate an in-cylinder negative pressure period in which the pressure in a cylinder of the engine 10 is negative pressure relative to the atmospheric pressure after starting the automatic stop of the engine 10, is stored in the memory section of the electronic control unit 30. In detail, as shown in FIG. 4, fresh intake air is not supplied into the cylinder of the engine 10 after a point in time t1, at which the automatic stop of the engine 10 is started so that fuel injection is stopped and at which the throttle valve is closed. On the other hand, the crankshaft 10a continues turning for a while because of inertia, and the gas in the cylinder is discharged as exhaust gas. Therefore, when the automatic stop of the engine 10 is started, the pressure in the cylinder becomes negative pressure relative to the atmospheric pressure. Although the inside of the cylinder remains in a negative pressure state for a while after a point in time t2, at which the crankshaft 10a is completely stopped, a gas flows into the cylinder from a small gap between an inner peripheral surface of the cylinder and a piston or from a gap of the throttle valve. Therefore, the pressure in the cylinder gradually approaches the atmospheric pressure after the crankshaft 10a has completely stopped, and the pressure in the cylinder becomes substantially equal to the atmospheric pressure after a point in time t3.

In the present embodiment, a period of time from the point in time t2, at which the rotation of the crankshaft 10a is completely stopped so that the engine rotation speed Ne of the engine 10 reaches zero until the pressure in the cylinder becomes equal to the atmospheric pressure is stored in the memory section of the electronic control unit 30 as the specified time X1. In other words, a point in time at which the specified time X1 has elapsed from the point in time t2, at which the engine rotation speed Ne of the engine 10 reaches zero, is a cranking time limit t3. The specified time X1 (cranking time limit t3) is appropriately determined in accordance with the specifications of the engine 10, the specifications of the motor generator 20, and a combination of the engine 10 and the motor generator 20. The specified time X1 is pre-calculated by performing tests, simulations, and the like, and is, for example, several seconds.

Next, a description will be given of an automatic-stop restart process of the engine 10 by the electronic control unit 30. In a state in which the engine 10 is running (a state in which the engine 10 is not automatically stopped), the following automatic-stop restart process is repeatedly performed in each predetermined control period.

Figure 5:
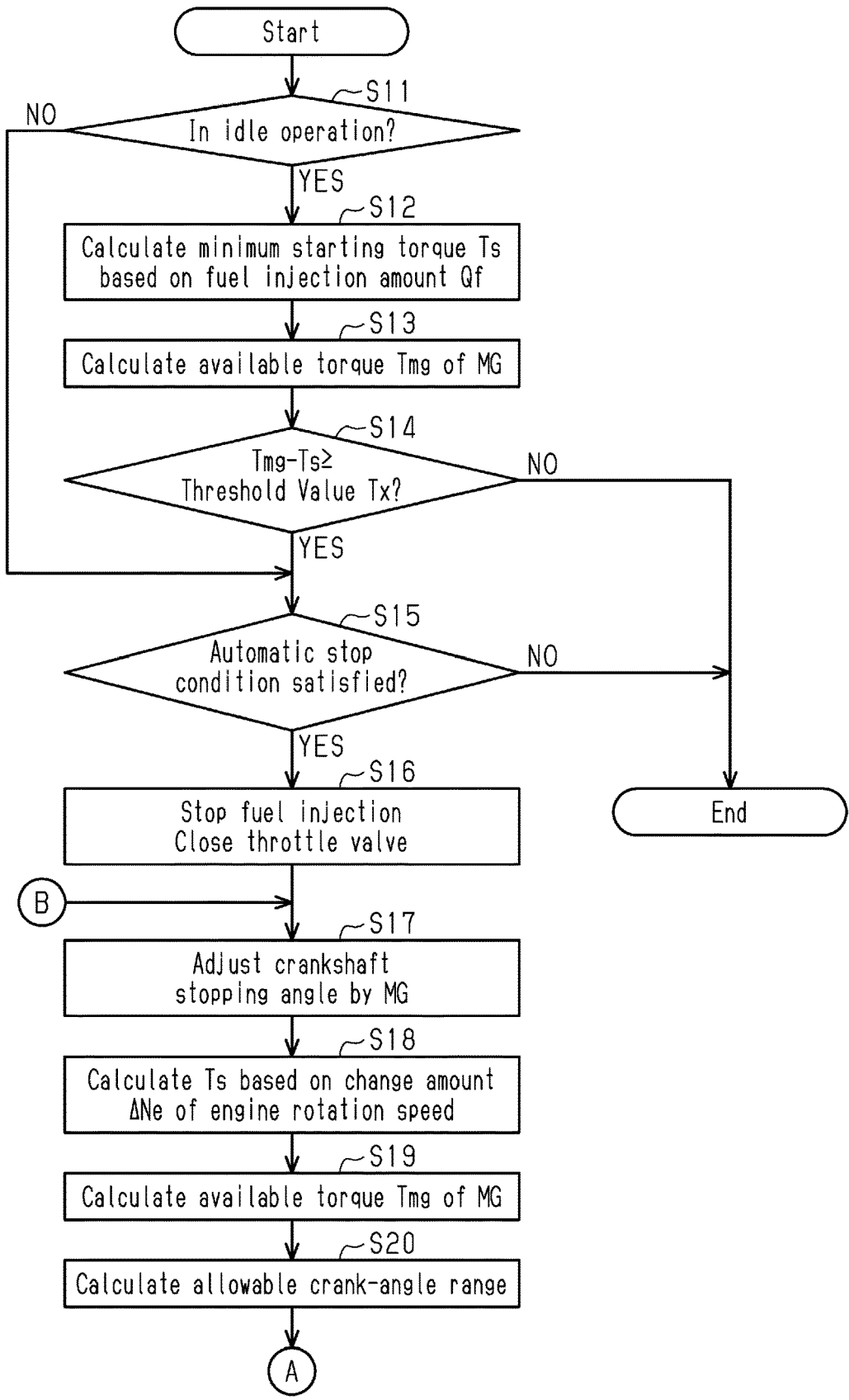
FIG. 5 is a flowchart showing an automatic stop restart process by means of an electronic control unit.

When the automatic-stop restart process is started, the process of the electronic control unit 30 shifts to step S11 as shown in FIG. 5. In step S11, the electronic control unit 30 determines whether the engine 10 is in idle operation. In detail, the electronic control unit 30 determines that the engine 10 is in idle operation when satisfying the condition that the engine rotation speed Ne of the engine 10 is lower than or equal to a predetermined rotation speed, the condition that the coolant temperature THW is higher than or equal to a predetermined temperature, the condition that the state of charge of the high-voltage battery 22 is higher than or equal to a predetermined value, the condition that the state of charge of the low-voltage battery 24 is higher than or equal to a predetermined value, the condition that the load of a non-electric auxiliary devices (e.g., air-conditioning compressor) drivably connected to the crankshaft 10a is smaller than or equal to a predetermined value, and the like. If the electronic control unit 30 determines that the engine 10 is not in idle operation (NO in step S11), the process of the electronic control unit 30 skips step S12 to step S14 described later, and shifts to step S15. If the electronic control unit 30 determines that the engine 10 is in idle operation (YES in step S11), the process of the electronic control unit 30 shifts to step S12.

In step S12, based on the fuel injection amount Qf of the engine 10 when step S12 is performed, the electronic control unit 30 calculates the minimum starting torque Ts required to restart the engine 10 if the engine 10 is automatically stopped. In detail, as shown in FIG. 3, the relationship between the stopping angle of the crankshaft 10a of the engine 10 that is in the ideal state and the starting torque required to restart the engine 10, which has been stopped, is stored in the memory section of the electronic control unit 30, and the minimum starting torque Ts1 is also pre-stored therein. Additionally, the fuel injection amount required to idle the engine 10 being in the ideal state is stored in the memory section of the electronic control unit 30. If deposits and the like accumulate on the cylinder or on the piston of the engine 10 so that the frictional resistance becomes great, the minimum starting torque Ts required to restart the engine 10 becomes greater than the minimum starting torque Ts1 in the ideal state as shown in FIG. 3 (shown in FIG. 3 as the minimum starting torques Ts2 and Ts3). Additionally, the fuel injection amount required to idle the engine 10 also becomes greater. Additionally, there is a positive correlation between the increment of the minimum starting torque Ts and the increment of the fuel injection amount required to idle the engine 10. Therefore, the electronic control unit 30 calculates the minimum starting torque Ts such that the greater the excess of the fuel injection amount Qf of the engine 10 when the step S12 is performed in relation to the prestored fuel injection amount, the greater becomes the excess of the minimum starting torque Ts in relation to the pre-stored minimum starting torque Ts1 in the ideal state. After calculating the minimum starting torque Ts, the process of the electronic control unit 30 shifts to step S13.

In step S13, the electronic control unit 30 calculates an available torque Tmg of the motor generator 20 on the basis of the state information IM sent from the sensor section 20b of the motor generator 20 and the state information IHb sent from the sensor section 22a of the high-voltage battery 22.

In detail, based on the state information IM, the electronic control unit 30 identifies the relationship between the rotation speed of the output shaft 20a of the motor generator 20 and the input current. For example, the available torque Tmg calculated by the electronic control unit 30 becomes smaller in proportion to a decrease in the rotation speed of the output shaft 20a for a certain input current. Furthermore, based on the state information IHb, the electronic control unit 30 calculates the state of charge of the high-voltage battery 22. If this state of charge is lower than or equal to a certain value, the available torque Tmg calculated by the electronic control unit 30 becomes smaller in proportion to a decrease in the state of charge. After calculating the available torque Tmg, the process of the electronic control unit 30 shifts to step S14.

In step S14, the electronic control unit 30 determines whether the value obtained by subtracting the minimum starting torque Ts from the available torque Tmg is greater than or equal to a threshold value Tx. Even if a calculating error in the available torque Tmg or in the minimum starting torque Ts occurs, the threshold value Tx is pre-set to a positive value so that the electronic control unit 30 can determine that the available torque Tmg is greater than the minimum starting torque Ts. If the electronic control unit 30 determines that the value obtained by subtracting the minimum starting torque Ts from the available torque Tmg is less than the threshold value Tx (NO in step S14), the series of steps of the automatic-stop restart process are ended. In other words, in this case, the automatic stop of the engine 10 is prohibited, and the automatic stop is not performed. If the electronic control unit 30 determines that the value obtained by subtracting the minimum starting torque Ts from the available torque Tmg is greater than or equal to the threshold value Tx (YES in step S14), the process of the electronic control unit 30 shifts to step S15.

In step S15, the electronic control unit 30 determines whether all conditions to automatically stop the engine 10 are satisfied. The conditions to automatically stop the engine 10 include the condition that the vehicle speed SP detected by the vehicle speed sensor 32 is lower than or equal to a predetermined speed, the condition that the engine rotation speed Ne of the engine 10 is lower than or equal to a predetermined rotation speed, the condition that the accelerator pedal of the vehicle is not depressed, the condition that the load of a non-electric auxiliary device drivably connected to the crankshaft 10a is smaller or equal to a predetermined value, the condition that the state of charge of the high-voltage battery 22 is higher than or equal to a certain value, the condition that the state of charge of the low-voltage battery 24 is higher than or equal to a certain value, and the like. If the electronic control unit 30 determines that at least one of the conditions to automatically stop the engine 10 is not satisfied (NO in step S15), the series of steps of the automatic-stop restart process are ended. In other words, in this case, the engine 10 is not automatically stopped. If the electronic control unit 30 determines that all conditions to automatically stop the engine 10 are satisfied (YES in step S15), the process of the electronic control unit 30 shifts to step S16.

In step S16, the electronic control unit 30 outputs a manipulation signal MSen to the engine 10, and, as a result, fuel injection in the engine 10 is stopped, and the throttle valve is closed. In other words, the electronic control unit 30 starts an automatic stop of the engine 10. After step S16 is started, the engine 10 does not operate, and therefore step S11 is never started even if a predetermined control period has elapsed. After step S16 is performed, the process of the electronic control unit 30 shifts to step S17.

In step S17, the electronic control unit 30 outputs a manipulation signal MSmg to the motor generator 20, and applies torque to the motor generator 20 or to the crankshaft 10a, and, as a result, the stopping angle of the crankshaft 10a is adjusted. The behavior of the crankshaft 10a displayed when the engine 10 is stopped varies because of a slight time-dependent change of the engine 10, a slight change in the external environment, and the like. Therefore, in some cases, the stopping angle at which stopping actually occurs deviates about several degrees to about tens of degrees from the targeted stopping angle even if the stopping angle of the crankshaft 10a is adjusted as described above. After step S17 is performed, the process of the electronic control unit 30 shifts to step S18.

In step S18, based on the crank angle CA detected by the crank angle sensor 31, the electronic control unit 30 calculates the absolute value of the amount of decrease of the engine rotation speed Ne of the engine 10 per unit time as a change amount $\Delta Ne$. Thereafter, based on the calculated change amount $\Delta Ne$, the electronic control unit 30 recalculates the minimum starting torque Ts. In detail, the electronic control unit 30 calculates the minimum starting torque Ts as a greater value in proportion to an increase in the change amount $\Delta Ne$ (in proportion to an increase in the reduced speed of the engine rotation speed Ne). In step S19 subsequent to step S18, the electronic control unit 30 calculates the available torque Tmg of the motor generator 20. The calculation method of the available torque Tmg in step S19 is the same as the calculation method described in step S13. After calculating the available torque Tmg, the process of the electronic control unit 30 shifts to step S20.

In step S20, based on the minimum starting torque Ts calculated in step S18 and based on the available torque Tmg calculated in step S19, the electronic control unit 30 calculates the stopping-angle range of the crank angle CA, in which the engine 10 can be restarted by cranking by means of the motor generator 20, as an allowable crank-angle range CAa. In detail, the electronic control unit 30 calculates the difference between the minimum starting torque Ts1 in the ideal state, which is stored in the memory section, and the minimum starting torque Ts calculated in step S18. Thereafter, the electronic control unit 30 calculates a value obtained by translating the relationship between the stopping angle of the crankshaft 10a and the starting torque in the ideal state so that the torque becomes greater in proportion to the aforementioned difference as the relationship between the stopping angle of the crankshaft 10a and the starting torque when step S20 is performed. Furthermore, the electronic control unit 30 compares the relationship between the stopping angle of the crankshaft 10a and the starting torque calculated as above with the available torque Tmg, and calculates a range in which the starting torque becomes smaller than or equal to the available torque Tmg as an allowable crank-angle range CAa. Thereafter, the process of the electronic control unit 30 shifts to step S21 shown in FIG. 6.

In step S21, the electronic control unit 30 determines whether the allowable crank-angle range CAa calculated in step S20 is larger than a predetermined specified range CAx. The specified range CAx is fixed in view of detection errors of the crank angle sensor 31 or the like, and is, for example, several degrees to tens of degrees. If the electronic control unit 30 determines that the allowable crank-angle range CAa is smaller than or equal to the specified range CAx (NO in step S21), the process of the electronic control unit 30 shifts to step S22.

In step S22, the electronic control unit 30 allows the motor generator 20 to function as a motor, and cranks the engine 10 (rotates the crankshaft 10a) by outputting a manipulation signal MSmg to the motor generator 20 not later than the cranking time limit t3. In the present embodiment, each process step is performed in units of several milliseconds to several hundred milliseconds at the longest. On the other hand, approximately one second to several seconds are taken from the start of the automatic stop of the engine 10 to the complete stop of the crankshaft 10a. Therefore, when the process reaches step S22 through step S21, the crankshaft 10a has not yet been stopped or, alternatively, has just been stopped. Additionally, the specified time X1 is set to several seconds. Therefore, in the present embodiment, step S22 is performed, and, as a result, the engine 10 is reliably cranked not later than the cranking time limit t3. In step S23 subsequent thereto, the electronic control unit 30 outputs a manipulation signal MSen to the engine 10, and, as a result, fuel injection is resumed in the engine 10. At this time, the throttle valve is also opened in response to the resumption of the fuel injection. Thereafter, the series of steps of the automatic-stop restart process are ended. In this case, the engine 10 is restarted before the crankshaft 10a is completely stopped although the automatic stop of the engine 10 is started.

On the other hand, if the electronic control unit 30 determines in step S21 that the allowable crank-angle range CAa is larger than the specified range CAx (YES in step S21), the process of the electronic control unit 30 shifts to step S24.

In step S24, the electronic control unit 30 waits for the crankshaft 10a to be stopped. Thereafter, the crank angle CA when the crankshaft 10a is stopped is detected as a stopping angle CAs. If the stopping angle CAs has been detected (YES in step S24), the process of the electronic control unit 30 shifts to step S25.

In step S25, the electronic control unit 30 compares the stopping angle CAs detected in step S24 with the allowable crank-angle range CAa calculated in step S20. Thereafter, the electronic control unit 30 determines whether the stopping angle CAs falls within the allowable crank-angle range CAa. If the electronic control unit 30 determines that the stopping angle CAs falls within the allowable crank-angle range CAa (YES in step S25), the process of the electronic control unit 30 shifts to step S26.

In step S26, the electronic control unit 30 determines whether there is a request to restart the engine 10, which has been automatically stopped. In the present preferred embodiment, a request to restart the engine 10 is made on account of the fact that at least any one of the aforementioned conditions for automatically stopping the engine 10 is no longer satisfied. If the electronic control unit 30 determines that there is not a request to restart the engine 10 (NO in step S26), the electronic control unit 30 performs step S26 again. In other words, the electronic control unit 30 waits until a request to restart the engine 10 is made. On the other hand, if the electronic control unit 30 determines that there is a request to restart the engine 10 (YES in step S26), the process of the electronic control unit 30 shifts to step S27.

In step S27, the electronic control unit 30 allows the motor generator 20 to function as a motor, and cranks the engine 10 (rotates the crankshaft 10a) by outputting a manipulation signal MSmg to the motor generator 20. In accordance therewith, the electronic control unit 30 outputs a manipulation signal MSen to the engine 10, and, as a result, fuel injection is resumed in the engine 10, and the throttle valve is opened. In other words, the electronic control unit 30 restarts the engine 10, which has been automatically stopped. Thereafter, the series of steps of the automatic-stop restart process are ended.

On the other hand, if the stopping angle CAs cannot be detected in step S24 (NO in step S24), the process of the electronic control unit 30 shifts to step S28. For example, a case in which a signal from the crank angle sensor 31 is lost because the crank angle sensor 31 is out of order or a case in which a noticeably abnormal value is shown because noises are superimposed on the signal emitted from the crank angle sensor 31 can be assumed as a situation in which the stopping angle CAs cannot be calculated. Likewise, if the electronic control unit 30 determines in step S25 that the stopping angle CAs is outside the allowable crank-angle range CAa, (NO in step S25), the process of the electronic control unit 30 shifts to step S28.

In step S28, the electronic control unit 30 allows the motor generator 20 to function as a motor, and cranks the engine 10 by outputting a manipulation signal MSmg to the motor generator 20 not later than the cranking time limit t3. In the present preferred embodiment, step S28 is performed without waiting time subsequent to step S24 or subsequent to step S25. Additionally, each process step is performed in units of several milliseconds to several hundred milliseconds at the longest. On the other hand, the specified time X1 is set to several seconds. Therefore, in the present embodiment, step S28 is performed, and, as a result, the engine 10 is reliably cranked not later than the cranking time limit t3. Subsequent to step S28, the process of the electronic control unit 30 shifts to step S29.

In step S29, the electronic control unit 30 determines whether there is a request to restart the engine 10, which has been automatically stopped. This determination content is the same as in the process performed in step S26. If the electronic control unit 30 determines that there is a request to restart the engine 10 (YES in step S29), the process of the electronic control unit 30 shifts to step S30.

In step S30, the electronic control unit 30 outputs a manipulation signal MSen to the engine 10, and, as a result, fuel injection is resumed in the engine 10. At this time, the throttle valve is also opened in response to the resumption of the fuel injection. Thereafter, the series of steps of the automatic-stop restart process are ended. In this case, the engine 10 is restarted in a state in which the crankshaft 10a is rotated by the motor generator 20 although the automatic stop of the engine 10 is executed.

On the other hand, if the electronic control unit 30 determines in step S29 that there is not a request to restart the engine 10 (NO in step S29), the process of the electronic control unit 30 shifts to step S31. In step S31, the electronic control unit 30 determines whether negative pressure can be generated in each cylinder of the engine 10 by allowing the motor generator 20 to crank the engine 10. In detail, the electronic control unit 30 determines that negative pressure can be generated if the state of charge of the high-voltage battery 22 is higher than or equal to a predetermined certain value. If the electronic control unit 30 determines that negative pressure cannot be generated, the process of the electronic control unit 30 shifts to step S30, and the engine 10 is restarted. In other words, in this case, the engine 10 is restarted regardless of the presence or absence of a request to restart the engine 10.

On the other hand, if the electronic control unit 30 determines in step S31 that negative pressure can be generated (YES in step S31), the process of the electronic control unit 30 shifts to step S32. In step S32, the cranking of the engine 10 by means of the motor generator 20, which has been started in step S28 mentioned above, is continuously performed. Thereafter, the process of the electronic control unit 30 shifts to step S33.

In step S33, the electronic control unit 30 determines whether a negative-pressure state relative to the atmospheric pressure has been regenerated in each cylinder of the engine 10. In detail, based on the crank angle CA detected by the crank angle sensor 31, the electronic control unit 30 determines whether a specified period of time has elapsed after starting the cranking of the engine 10 by means of the motor generator 20 in step S28. In the present embodiment, the specified period is defined as a period of time from when the engine 10 is cranked by the motor generator 20 until when the crankshaft 10a rotates by a certain angle. This certain angle is, for example, several hundred to several thousand degrees (equal to several rotations of the crankshaft 10a). If the specified period has not elapsed after starting to crank the engine 10, the electronic control unit 30 determines that negative pressure has not yet been generated (NO in step S33), and the process of the electronic control unit 30 returns to step S31. On the other hand, if the specified period has elapsed after starting to crank the engine 10, the electronic control unit 30 determines that negative pressure has been generated (YES in step S33), and the process of the electronic control unit 30 shifts to step S17 shown in FIG. 5. Thereafter, the electronic control unit 30 re-performs the process of step S17 and the steps subsequent to step S17.

The operation and advantages of the present embodiment will now be described.

When allowing the engine 10, which has been automatically stopped, to be cranked by the motor generator 20 as in the aforementioned embodiment, it is preferable to form a configuration in which cranking can be started by means of the motor generator 20 regardless of the stopping angle CAs of the crankshaft 10a. Therefore, the motor generator 20 is generally designed such that the available torque Tmg1 of the motor generator 20 exceeds the starting torque regardless of the stopping angle CAs of the crankshaft 10a when deterioration has not occurred in the output characteristics of the motor generator 20 and when the state of charge of the high-voltage battery 22, which supplies electric power to the motor generator 20, is sufficient (for example, not less than 50%) as shown in FIG. 2.

There is a case in which time-dependent deterioration occurs in the output characteristics of the motor generator 20 even if the motor generator 20 is designed as above. In this case, for example, the available torque Tmg of the motor generator 20 is lowered from the available torque Tmg1 in which time-dependent deterioration does not occur to the available torque Tmg2 as shown in FIG. 2. Consequently, the difference between the available torque Tmg2 and the minimum starting torque Ts becomes smaller than the difference between the available torque Tmg1 and the minimum starting torque Ts. Additionally, the available torque Tmg2 exceeds the starting torque only within the allowable crank-angle range CAa1 of the stopping angle A1 to the stopping angle A2, and the allowable crank-angle range CAa becomes narrower.

Still additionally, if the state of charge of the high-voltage battery 22 is small and if the output voltage or the output current that can be output to the motor generator 20 becomes smaller, the available torque Tmg of the motor generator 20 is lowered to a smaller available torque Tmg3. As a result, the difference between the available torque Tmg3 and the minimum starting torque Ts becomes even smaller. Additionally, the available torque Tmg3 exceeds the starting torque only within the allowable crank-angle range CAa2 of the stopping angle A3 to the stopping angle A4, and the allowable crank-angle range CAa becomes even narrower.

On the other hand, there is a case in which a change occurs in the starting torque in the engine 10 even if a change is not caused in the output characteristics of the motor generator 20 as described above. In detail, the starting torque becomes greater than the starting torque in the ideal state if deposits accumulate on various parts, such as cylinders and pistons of the engine 10, so that the frictional resistance becomes greater as shown in FIG. 3. As a result, as shown in FIG. 3, the minimum starting torque Ts of the engine 10 increases from the minimum starting torque Ts1 in the ideal state in proportion to an increase in the amount of accumulation of deposits as shown by the minimum starting torque Ts2 and by the minimum starting torque Ts3. As a result, the difference between the available torque Tmg and the minimum starting torque Ts becomes smaller. Additionally, the allowable crank-angle range CAa becomes narrower as shown by the allowable crank-angle range CAa3 of a stopping angle B1 to a stopping angle B2 and by the allowable crank-angle range CAa4 of a stopping angle B3 to a stopping angle B4.

In the aforementioned embodiment, the engine 10 is not automatically stopped if the value obtained by subtracting the minimum starting torque Ts from the available torque Tmg is less than the threshold value Tx (see step S14 in FIG. 5). In other words, the automatic stop of the engine 10 is prohibited if the allowable crank-angle range CAa is extremely narrow or does not exist. Therefore, the automatic stop of the engine 10 does not occur in spite of the fact that the engine 10 cannot be cranked by the motor generator 20.

By the way, it is likely that the engine 10 can be cranked by the motor generator 20 if the stopping angle CAs of the crankshaft 10a when the engine 10 is stopped is within the allowable crank-angle range CAa. However, if the allowable crank-angle range CAa is extremely narrow, the possibility that the stopping angle CAs will fall within the allowable crank-angle range CAa is low. Additionally, a certain error might occur when the stopping angle CAs is detected as described above. Therefore, even if the stopping angle CAs falls within the allowable crank-angle range CAa from the viewpoint of the detection value of the crank angle sensor 31, the possibility that the stopping angle CAs of the actual crankshaft 10a will deviate from the allowable crank-angle range CAa is high if the allowable crank-angle range CAa is narrow.

Figure 6:
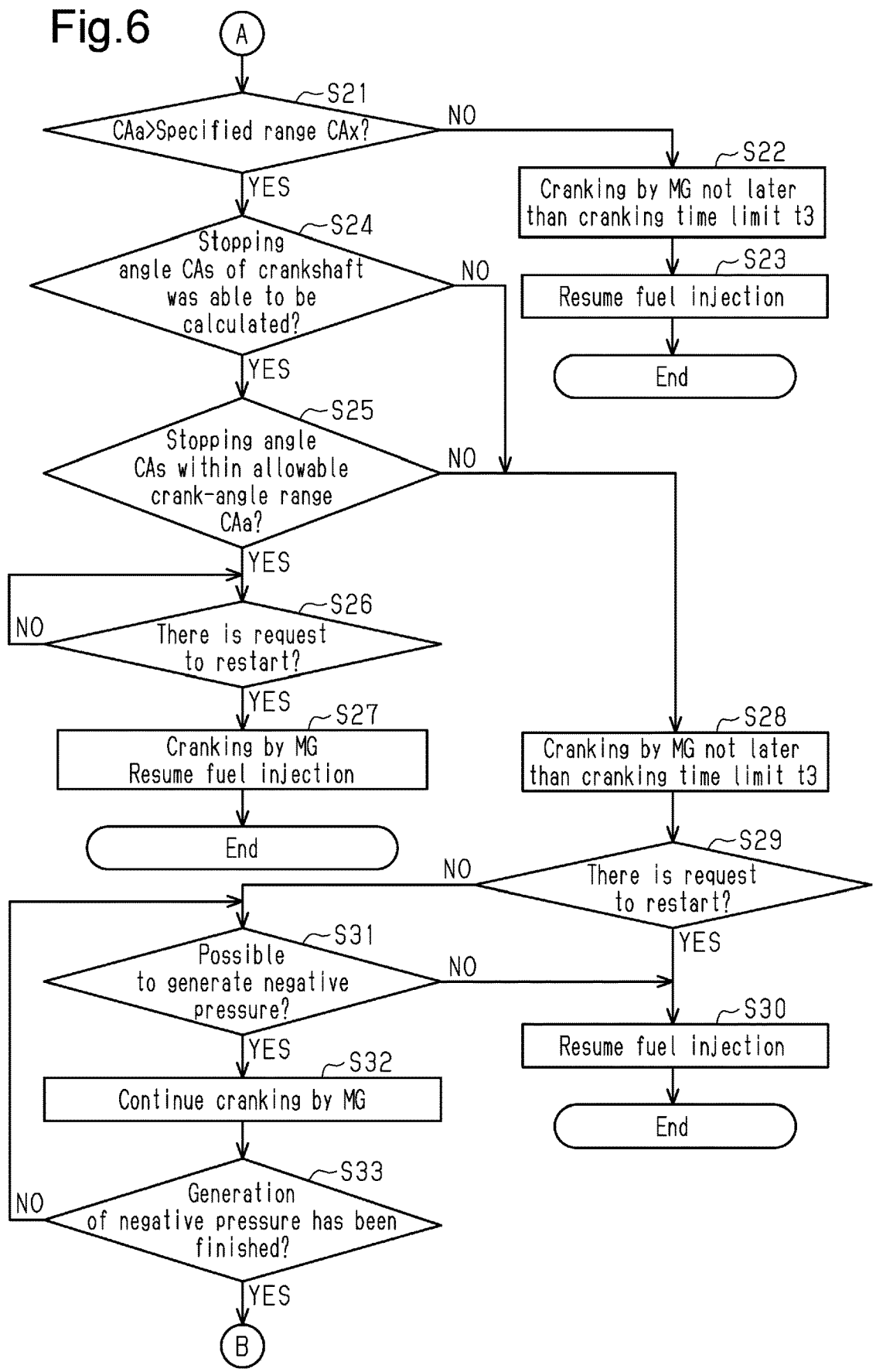
FIG. 6 is a flowchart showing the automatic stop restart process by means of the electronic control unit.

In the aforementioned embodiment, the engine 10 is cranked by the motor generator 20 if the allowable crank-angle range CAa is smaller than or equal to the specified range CAx (see step S21 and step S22 in FIG. 6). Therefore, the crankshaft 10a is restrained from being stopped at a stopping angle CAs at which the engine 10 cannot be cranked by the motor generator 20.

In the aforementioned embodiment, it is determined whether the stopping angle CAs falls within the allowable crank-angle range CAa when the allowable crank-angle range CAa is wider than the specified range CAx. If the stopping angle CAs is outside the allowable crank-angle range CAa, it becomes impossible to start the cranking of the engine 10 by means of the motor generator 20.

In this respect, in the aforementioned embodiment, if the stopping angle CAs is outside the allowable crank-angle range CAa, the engine 10 is cranked by the motor generator 20 before an in-cylinder negative pressure period elapses from when the automatic stop of the engine 10 is started. If the engine 10 is cranked in this way, the crankshaft 10a is never stopped at a stopping angle CAs at which restart cannot be performed by the motor generator 20. Therefore, time is not taken to adjust the stopping position of the crankshaft 10a. As a result, if there is a request to restart the engine 10, it is possible to swiftly restart the engine 10.

In the in-cylinder negative pressure period, the pressure in the cylinder of the engine 10 is negative pressure relative to the atmospheric pressure. Therefore, it is possible to rotate the crankshaft 10a by using the negative pressure of the inside of the cylinder. Therefore, if the period is within this in-cylinder negative pressure period, it is possible to start the cranking of the engine 10 by means of the motor generator 20 even if the stopping angle CAs of the crankshaft 10a is outside the allowable crank-angle range CAa.

In the aforementioned embodiment, the minimum starting torque Ts is calculated on the basis of the fuel injection amount Qf before starting the automatic stop of the engine 10 (prior to step S16). On the other hand, after starting the automatic stop of the engine 10, the minimum starting torque Ts is calculated by using a change amount ΔNe per unit time of the engine rotation speed Ne. The change amount ΔNe of the engine rotation speed Ne more directly reflects friction or the like between the piston and the cylinder in the engine 10 in comparison with the fuel injection amount Qf. In other words, the change amount ΔNe of the engine rotation speed Ne has a high correlation with respect to the starting torque. Grounding on the thus characterized change amount ΔNe of the engine rotation speed Ne makes it possible to more accurately calculate the allowable crank-angle range CAa.

In the aforementioned embodiment, when the cranking of the engine 10 by means of the motor generator 20 is started within the in-cylinder negative pressure period of the engine 10, cranking is continuously performed, and negative pressure is re-generated in the cylinder of the engine 10 if there is room in the state of charge of the high-voltage battery 22. If negative pressure is re-generated in the cylinder of the engine 10 by continuously performing cranking for or beyond the specified time, the cranking is stopped. Therefore, the state of charge of the high-voltage battery 22 is restrained from being excessively lowered in order for the motor generator 20 to continuously crank the engine 10. Additionally, when the cranking of the engine 10 is stopped, negative pressure is regenerated as described above, and therefore it is possible to again create a situation in which the engine 10 has been automatically stopped. The thus performed control makes it possible to again perform the series of steps of the process subsequent to the start of the automatic stop of the engine 10.

On the other hand, if the state of charge of the high-voltage battery 22 is lower than or equal to a certain value after starting the cranking of the engine 10 by means of the motor generator 20 within the in-cylinder negative pressure period of the engine 10, fuel injection in the engine 10 is resumed, and the engine 10 is restarted. In other words, if a situation in which the engine 10 is cranked by the motor generator 20 continues for a long time, fuel injection into the engine 10 is resumed. Therefore, in order for the motor generator 20 to continuously crank the engine 10, it is possible to restrain the state of charge of the high-voltage battery 22 from being excessively lowered.

The present embodiment may be modified as follows. The present embodiment and the following modifications can be combined as long as the combined modifications remain technically consistent with each other.

The mode in which the engine 10 and the motor generator 20 are drivably connected together is not limited to the aforementioned embodiment. Additionally, a decelerating mechanism composed of, for example, a plurality of gears, a clutch that connects/disconnects a driving-force transmission path, and the like, in addition to the first pulley 12, the transmission belt 13, and the second pulley 14, may be interposed between the engine 10 and the motor generator 20.

The output voltage of the high-voltage battery 22 and that of the low-voltage battery 24 do not matter. Additionally, the output voltage of the low-voltage battery 24 is not necessarily required to be lower than the output voltage of the high-voltage battery 22, and both output voltages may be equal to each other.

The kind of the high-voltage battery 22 and that of the low-voltage battery 24 are not limited to the examples of the aforementioned embodiment. For example, a nickel hydrogen battery, a NAS battery, an all solid-state battery, and the like, besides a lithium-ion battery and a lead-acid battery, may be employed as the high-voltage battery 22 and as the low-voltage battery 24.

A motor generator that chiefly assists the traveling torque of the engine 10 and a motor generator that chiefly generates electricity by torque from the engine 10 may be provided separately. In this case, it is recommended to apply the automatic-stop restart process of the aforementioned embodiment onto the motor generator that assists the traveling torque of the engine 10.

In the aforementioned embodiment, the stopping angle CAs of the crankshaft 10a may be a predictive stopping angle CAs without being limited to the detection of the crank angle CA when the crankshaft 10a is actually stopped. In other words, the predictive stopping angle CAs may be a stopping angle CAs detected by the stopping-angle detection section 30a of the electronic control unit 30. For example, it is possible to predict the stopping angle CAs of the crankshaft 10a when the engine 10 is automatically stopped on the basis of the crank angle CA detected by the crank angle sensor 31 or on the basis of a change in the engine rotation speed Ne after starting the automatic stop of the engine 10. In this modification, it is possible to perform a process including step S24 and the steps subsequent to step S24 without waiting for the stop of the crankshaft 10a.

The process of step S21 to step S23 in the aforementioned embodiment may be omitted, and it may be determined whether the stopping angle CAs falls within the allowable crank-angle range CAa regardless of the size of the allowable crank-angle range CAa (step S25 may be performed). If high accuracy can be expected as the detection accuracy of the stopping angle CAs, it might be preferable to reduce a processing burden of the electronic control unit 30 by omitting the process of step S21 to step S23 in some cases.

The process of step S31 in the aforementioned embodiment may be omitted, and the cranking of the engine 10 by means of the motor generator 20 may be continuously performed regardless of the state of charge of the high-voltage battery 22. The period of time of the automatic stop of the engine 10 assumed in the aforementioned embodiment is approximately several minutes to ten-odd minutes at the longest. Additionally, the state of charge of the high-voltage battery 22 is controlled so as to fall within a certain range (e.g., 40% to 70%) while the engine 10 is operating. Therefore, if the maximum state of charge (full state of charge) of the high-voltage battery 22 is suitably large, it is possible to restrain the state of charge of the high-voltage battery 22 from being excessively lowered even if the cranking of the engine 10 by means of the motor generator 20 is continuously performed. Additionally, if an electric auxiliary device driven by the high-voltage battery 22 does not exert a great influence on vehicle traveling even if the state of charge of the high-voltage battery 22 is excessively lowered, a problem will not arise even if the cranking of the engine 10 by means of the motor generator 20 is continuously performed.

In the aforementioned embodiment, if the cranking of the engine 10 by means of the motor generator 20 is started within the in-cylinder negative pressure period, fuel injection in the engine 10 may be resumed, and the engine 10 may be restarted regardless of the presence or absence of a restart request. For example, when the maximum state of charge of the high-voltage battery 22 is small, the state of charge of the high-voltage battery 22 is liable to be lowered if the cranking by means of the motor generator 20 is continuously performed. In this case, it is also effective to restart the engine 10 regardless of the state of charge of the high-voltage battery 22.

In step S14 of the aforementioned embodiment, the threshold value Tx can be appropriately changed if the threshold value Tx is a zero or more. If the threshold value Tx is set to a large value, the possibility that an actual stopping angle of the crankshaft 10a will be placed outside the allowable crank-angle range CAa will be lowered in spite of the fact that the determination of step S14 is affirmative. On the other hand, if the threshold value Tx is set to a small value, the opportunity of enabling the automatic stop of the engine 10 will be increased.

In step S14 of the aforementioned embodiment, it is permissible to subtract the maximum value (maximum starting torque) of the starting torque of the engine 10 from the available torque Tmg of the motor generator 20 and to make a comparison between the resultant subtraction value and another threshold value differing from the threshold value Tx. The starting torque is translated toward the high-torque side because of accumulation of deposits and the like in the engine 10 as shown in FIG. 3. Therefore, the minimum starting torque and the maximum starting torque of the engine 10 vary in conjunction with each other. Therefore, it is also possible to make an indirect comparison between the minimum starting torque Ts and the threshold value Tx by comparing the value obtained by subtracting the maximum starting torque from the available torque Tmg with the threshold value.

In the aforementioned embodiment, the minimum starting torque may be calculated on the basis of the fuel injection amount Qf when the engine 10 is in a predetermined drive state exclusive of being in idle operation, instead of calculating the minimum starting torque Ts on the basis of the fuel injection amount Qf when the engine 10 is in idle operation. For example, the predetermined drive state includes a state in which parameters, such as the opening degree of the throttle valve and the engine rotation speed Ne in the engine 10, that affect a combustion state in the engine 10 are made constant. Based on the fuel injection amount Qf in this state, the minimum starting torque Ts can also be calculated.

In the aforementioned embodiment, the process of step S11 to step S14 may be omitted. The omission of the process of step S11 to step S14 will not cause a problem if it is unlikely that the available torque Tmg will become smaller than the minimum starting torque Ts even if the available torque Tmg of the motor generator 20 or the starting torque of the engine 10 varies somewhat, because the difference between the available torque Tmg of the motor generator 20 and the starting torque of the engine 10 is large.

The calculation method of the minimum starting torque Ts is not limited to the example of the aforementioned embodiment. For example, the engine rotation speed Ne of the engine 10 is set to a predetermined rotation speed by applying torque to the crankshaft 10a from the motor generator 20 in a state in which the fuel injection amount in the engine 10 is constant without being changed. If the friction in the engine 10 is large and therefore the minimum starting torque Ts is large, the output torque of the motor generator 20 when a control operation is performed as above also becomes large. Therefore, it is also possible to calculate the minimum starting torque Ts based on the output voltage or the output current of the motor generator 20 at this time.

Any calculation method of the allowable crank-angle range CAa can be employed. For example, it is permissible to divert the minimum starting torque Ts calculated in step S12 and to calculate the allowable crank-angle range CAa on the basis of the resultant diversion value, instead of calculating the minimum starting torque Ts in step S18 on the basis of the change amount $\Delta Ne$ of the engine rotation speed Ne.

Additionally, for example, the allowable crank-angle range CAa may be calculated on the basis of an integration value of vehicle traveling distance. It is conceivable that the amount of accumulation of deposits in the engine 10 or deterioration in the output characteristics of the motor generator 20 has a correlation with the integration value of vehicle traveling distance. Therefore, a certain degree of accuracy can be expected even when the allowable crank-angle range CAa is calculated on the basis of the integration value of traveling distance.

In addition to this, the allowable crank-angle range CAa may fall within a predetermined fixed range if the process of step S21 to step S23 is omitted.

In the aforementioned embodiment, the allowable crank-angle range CAa is not necessarily required to be calculated. For example, a relational expression or the like in which the minimum starting torque Ts of the engine 10, the available torque Tmg of the motor generator 20, and the stopping angle CAs of the crankshaft 10a are defined as variables is pre-stored in the memory section of the electronic control unit 30. Thereafter, based on a value derived by this relational expression, it may be determined whether the stopping angle CAs is within or outside the stopping-angle range of the crank angle in which the engine 10 can be cranked and restarted by the motor generator 20.

The in-cylinder negative pressure period may be fixed as a specified time from the point in time t1, at which fuel injection is stopped and the throttle valve is closed in the engine 10, instead of fixing the in-cylinder negative pressure period on the basis of the specified time X1, from point in time t2 at which the crankshaft 10a is stopped.

Although the specified time X1 is set to a period of time elapsing from the point in time t2 at which the crankshaft 10a is stopped in the aforementioned embodiment, the present invention is not limited to this. For example, the specified time X1 may be defined as a period of time after the rotation speed of the crankshaft 10a (the engine rotation speed Ne) has reached a predetermined rotation speed.

Although the specified time X1 is set to a period of time until the pressure in the cylinder of the engine 10 becomes equal to the atmospheric pressure in the aforementioned embodiment, the present invention is not limited to this. For example, the specified time X1 may be set to a period of time until the pressure in the cylinder of the engine 10 becomes lower by prescribed pressure than the atmospheric pressure. Depending on characteristics of the engine 10 or of the motor generator 20, it is likely that the engine 10 still cannot be cranked by the motor generator 20 in a state in which the pressure in the cylinder of the engine 10 is somewhat smaller than the atmospheric pressure. In this case, the engine 10 can be reliably cranked by setting the specified time X1 as in this modification.

Although the specified period in which the pressure in the cylinder of the engine 10 again becomes negative pressure is defined as a period of time until the crankshaft 10a is rotated by a certain angle in the aforementioned embodiment, this may be set defined by time. If the specified period is defined by time, it is preferable to employ, for example, approximately several hundred milliseconds to several seconds.

Although the engine 10 is cranked by the motor generator 20 not later than the cranking time limit t3, and then the engine 10 is restarted by resuming fuel injection in the aforementioned embodiment, the cranking of the engine 10 by means of the motor generator 20 can be omitted. For example, if it is immediately after starting the automatic stop of the engine 10, the crankshaft 10a is still being rotated. If it is a period of time in which the crankshaft 10a has not yet been completely stopped as above, there is room for the engine 10 to be restarted only by resuming fuel injection without cranking.

If it is determined that the allowable crank-angle range CAa is larger than the specified range CAx in step S21 of the aforementioned embodiment, the process of step S24 to step S33 subsequent thereto may be omitted. In this case, if it is determined that the allowable crank-angle range CAa is larger than the specified range CAx, it is recommended to stop the crankshaft 10a as it is and to restart the engine 10 in accordance with a restart request.

In the engine 10, there is a configuration, such as an electric intake valve, that is capable of controlling the opening degree (amount of lift) of the intake valve, which differs from the revolution of the crankshaft 10a. If the engine 10 is a thus configured engine, it is also possible to limit the intake air amount into the engine 10 by reducing the opening degree of the intake valve, instead of or in addition to closing the throttle valve when the engine 10 is automatically stopped.

If it is possible to allow a vehicle to travel only by torque from the motor generator 20 without changing a state in which the fuel injection of the engine 10 has been stopped in the aforementioned embodiment, the vehicle may be allowed to travel by means of torque from the motor generator 20, instead of resuming fuel injection after the engine 10 is cranked by the motor generator 20.

The electronic control unit 30 is not limited to one that performs software processing on all processes executed by itself. For example, the electronic control unit 30 may include at least part of the processes executed by the software in the present embodiment as one that is executed by hardware circuits dedicated to execution of these processes (such as ASIC). That is, the electronic control unit 30 may be modified as long as it has any one of the following configurations (a) to (c). (a) A configuration including a processor that executes all of the above-described processes according to programs and a program storage device such as a ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A start controller that is employed in a hybrid system including an engine serving as a driving source of a vehicle and a motor generator drivably connected to the engine, the start controller comprising:
   a drive control section that automatically stops the engine and limits an intake air amount into the engine by stopping fuel injection in the engine when a predetermined specified condition is satisfied; and
   a stopping-angle detection section that detects a crank angle of a crankshaft when the engine is automatically stopped as a stopping angle,
   wherein the drive control section is configured such that, if the stopping angle is outside a stopping-angle range of the crank angle in which it is possible to restart the engine by cranking the engine by means of the motor generator, the drive control section cranks the engine by means of the motor generator or to restart the engine by resuming fuel injection in the engine before an in-cylinder negative pressure period, which is defined as a period of time in which pressure in a cylinder of the engine is negative pressure relative to an atmospheric pressure, elapses after starting to automatically stop the engine.

2. The start controller according to claim 1, further comprising:
   a torque calculating section that calculates an available torque of the motor generator; and
   a starting-torque calculating section that calculates a starting torque required to restart the engine based on a fuel injection amount when the engine is in a predetermined drive state,
   wherein the drive control section is configured to prohibit an automatic stop of the engine regardless of the specified condition if a value obtained by subtracting a minimum torque of the starting torque from the available torque is smaller than a predetermined threshold value.

3. The start controller according to claim 1, wherein the drive control section is configured to automatically stop the engine by stopping cranking the engine by means of the motor generator if a specified period elapses that is predetermined as a period of time in which pressure in a cylinder of the engine again becomes negative pressure relative to the atmospheric pressure after the engine is cranked by the motor generator before the in-cylinder negative pressure period elapses.

4. The start controller according to claim 1, wherein the drive control section is configured to resume a fuel injection in the engine and restart the engine if the state of charge of a battery that supplies electric power to the motor generator is lower than or equal to a certain value after the engine is cranked by the motor generator before the in-cylinder negative pressure period elapses.

5. A start controller that is employed in a hybrid system including an engine serving as a driving source of a vehicle and a motor generator drivably connected to the engine, the start controller comprising:
   a drive control section that automatically stops the engine and limits an intake air amount into the engine by stopping fuel injection in the engine when a predetermined specified condition is satisfied; and
   an allowable-angle calculating section that calculates, as an allowable crank-angle range, a stopping-angle range of a crank angle in a crankshaft in which it is possible to restart the engine by cranking the engine by means of the motor generator,
   wherein the drive control section is configured such that, if the allowable crank-angle range is smaller than or equal to a predetermined specified range, the drive control section cranks the engine by means of the motor generator or to restart the engine by resuming the fuel injection in the engine before an in-cylinder negative pressure period, which is defined as a period of time in which pressure in a cylinder of the engine is negative pressure relative to an atmospheric pressure, elapses after starting to automatically stop the engine.

6. The start controller according to claim 5, further comprising a torque calculating section that calculates an available torque of the motor generator,
   wherein the allowable-angle calculating section is configured to calculate the allowable crank-angle range based on the available torque and a change amount of an engine rotation speed of the engine per unit time when the engine is automatically stopped.

7. A start controlling method that is employed in a hybrid system including an engine serving as a driving source of a vehicle and a motor generator drivably connected to the engine, the start controlling method comprising:
   automatically stopping the engine and limiting an intake air amount into the engine by stopping fuel injection in the engine when a predetermined specified condition is satisfied;
   detecting a crank angle of a crankshaft when the engine is automatically stopped as a stopping angle; and
   if the stopping angle is outside a stopping-angle range of the crank angle in which it is possible to restart the engine by cranking the engine by means of the motor generator, cranking the engine by means of the motor generator or restarting the engine by resuming the fuel injection in the engine before an in-cylinder negative pressure period, which is defined as a period of time in which pressure in a cylinder of the engine is negative pressure relative to an atmospheric pressure, elapses after starting to automatically stop the engine.

8. A start controlling method that is employed in a hybrid system including an engine serving as a driving source of a vehicle and a motor generator drivably connected to the engine, the start controlling method comprising:
   automatically stopping the engine and limiting an intake air amount into the engine by stopping fuel injection in the engine when a predetermined specified condition is satisfied;
   calculating, as an allowable crank-angle range, a stopping-angle range of a crank angle in a crankshaft in which it is possible to restart the engine by cranking the engine by means of the motor generator; and
   if the allowable crank-angle range is smaller than or equal to a predetermined specified range, cranking the engine by means of the motor generator or restarting the engine by resuming the fuel injection in the engine before an in-cylinder negative pressure period, which is defined as a period of time in which pressure in a cylinder of the engine is negative pressure relative to an atmospheric pressure, elapses after starting to automatically stop the engine.

\* \* \* \* \*